Aug. 9, 1966 A. OSBORNE 3,265,942

APPARATUS PROVIDING COMPACT SEMICONDUCTOR UNIT

Filed March 27, 1961

INVENTOR

ALBERT OSBORNE

BY Jacobi & Jacobi

ATTORNEYS 3,265,942
APPARATUS PROVIDING COMPACT SEMICONDUCTOR UNIT

Albert Osborne, 200 Melbourne Road, Great Neck, N.Y.

Filed Mar. 27, 1961, Ser. No. 98,593
3 Claims. (Cl. 317—234)

This invention relates to methods of packaging a plurality of semiconductors and/or components associated therewith in a unitary assembly, and to devices or apparatus used in accordance with such method.

The utilization of semiconductor means has become universally widespread in the last few years. For many applications it is desirable and/or necessary to use either the same type or different types of semiconductive devices for a given circuit. In some instances, two or more transistors may be incorporated in the circuit, while in other instances a transistor and a diode may be incorporated in the circuit, or a plurality of transistors and a plurality of diodes may be incorporated in the circuit. Thus, regardless of the type of semiconductive device used, whether now in wide use, or to be developed, there exists a need for some simple and efficient means of supporting and/or packaging a plurality of semiconducting devices of the same or different types in a unitary assembly having a plurality of leads extending therefrom.

Semiconductive devices, in addition to providing improved results for certain applications, most always serve to minimize the space required for an assembly of components adapted to electronically produce a desired result. Accordingly, semiconductive devices, inherently, in and of themselves, serve to minimize space requirements. Notwithstanding this fact, however, where a system requires the utilization of a plurality of semiconductive devices, the space requirement of each of the devices serves to limit the extent to which space can be conserved.

The problem has been attacked previously from the standpoint of utilizing one block of material as a common element of a plurality of semiconductive devices to be incorporated in a unit. In other words, as opposed to attacking the problem from the standpoint of minimizing space in which existing semiconductive devices can be placed or assembled, workers in the art have attacked the problem by attempting to combine a plurality of semiconductive elements in such a manner that one or more elements of the novel unit is common to all of the semiconductive devices.

In contrast with attacking the problem in the manner prescribed above, the present invention is directed to providing methods and apparatus which enable packaging of standard semiconductive units in a minimum of space and in any preselected combinations desired.

A primary object of the present invention is to provide an improved form of semiconductor package, and to provide a basic component, hereinafter referred to as a header, which enables the manufacture of small semiconductive assemblies incorporating a plurality of standard semiconductive devices and associated components, if desired.

A still further, and somewhat more specific object of the present invention is to provide a header for simultaneously supporting a plurality of semiconductors to provide a miniaturized, condensed, and/or compact semiconductor assembly.

Still other, yet further, and more specific objects of the present invention are: (a) to provide a header conforming with all of the preceding objects, which header comprises a frame member and a plurality of electrically conductive rods extending within and through the frame member in insulated spaced relation to one another, and to the frame member, whereby semiconductive devices can be coupled with the rods in a manner providing a miniaturized assembly; (b) to provide a header as prescribed hereinabove wherein the frame member is formed of separate components made of different materials, and the rod is formed from a still different material, but the materials are temperature complementary whereby the header may be subjected to varying temperatures without destroying the properties thereof; (c) to provide a header conforming with the preceding objects wherein one element of each semiconductive device can be, and is, directly physically and electrically coupled with one of the rods, and the other elements of the semiconductive device are electrically coupled with another of such rods; (d) to provide such a header and semiconductive assembly package which are easily and inexpensively fabricated and/or assembled; (e) to provide such a header and/or semiconductor package wherein the header or package components/ serve to distribute any heat which may be generated in the area of the semiconductive devices so as to prevent overheating thereof; (f) to provide such a header and semiconductor package wherein any number of semiconductive devices of the same or different types may be incorporated in a unitary structure; (g) to provide such a header and semiconductor package which controls and effectively eliminates all thermal, electrical, magnetic, and physical interference with any, or between any, semiconductive devices mounted on the header or within the package; and (h) to provide such a header and semiconductor assembly which can be easily enclosed by means of a suitable cap member, or which can be completely encased within a suitable moldable insulating material such as, for example, plastic, if desired.

A semiconductor package constructed in accordance with the present invention includes at least two semiconductors, and as is wellknown, each of such semiconductors include at least two cooperating semiconductive elements. The package further includes a support member and a plurality of electrically conductive rods extending through the support member. The rods are electrically insulated from each other, and one element of each of the semiconductors is directly physically and electrically connected on one side of the support member to a different one of the rods. The other element of each of the semiconductors are electrically connected to still different ones of the rods. While a semiconductor package constructed in accordance with the present invention would be fabricated in this manner, and while the invention is not limited to the illustrative embodiment described in detail below, the preferred embodiments of the invention provide for particular assembly details and components, and it will be understood that the invention lies in the manner of assembly as well as the combination, construction, arrangement, and materials of the various components.

The invention will be better understood, and objects other than those specifically set forth hereinabove will become apparent, when consideration is given to the following detailed description of the preferred and illustrative embodiments of the invention. Such embodiments are presented in the annexed drawings, wherein.

Figure 1:
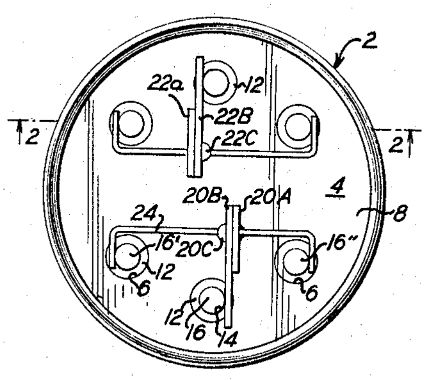
FIGURE 1 is a plan view of a header constructed in accordance with the present invention and carrying thereon two transistors.
Figure 2:
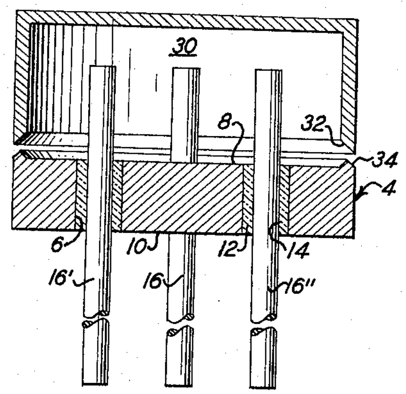
FIGURE 2 is a cross-sectional view taken on the line 2—2 of FIGURE 1 and presenting the construction shown in FIGURE 1 without the transistors attached, but with a cover member applied to the header.

If reference is made to FIGURE 1, it will be noted that the header provided by the present invention is generally designated by the numeral 2. This header comprises a disc member 4 having a plurality of spaced-apart openings 6 therein. The openings 6, as best shown in FIGURE 2, extend between the opposed faces 8 and 10 of the disc member 4. Within each opening 6, there is disposed an electrically insulating cylindrical member or collar 12. Each of the collars 12 has an outer diameter corresponding with the diameter of the openings 6, which are cylindrical as shown, and each of the collars 12 terminates at opposite ends thereof flush with the opposed surfaces 8 and 10 of disc member 4. Moreover, each of the cylindrical members or collars 12 has a cylindrical bore 14 extending centrally therethrough. A plurality of elongated electrically conductive cylindrical rods 16 extend through the cylindrical bores 14 in each of the collars or cylindrical members 12. The rods project beyond opposed ends of the cylindrical members 12 as well as beyond the opposed sides 8 and 10 of the disc member. The rods, as best shown in FIGURE 2, engage the walls of the bores.

As shown in FIGURE 1, two semiconductive devices, generally designated by the numerals 20 and 22, are coupled with the rods projecting beyond the face 8 of the disc member. These semiconductive devices are transistors and include three semiconductive elements 20A, 20B and 20C, and 22A, 22B and 22C, respectively.

The semiconductive element 20B is connected directly electrically and physically with the rod designated by the numeral 16 in FIGURE 1. The semiconductive element 20C is connected via a wire 24 with the rod 16′, and the semiconductive element 20A is connected via a wire 26 with the rod 16″. The semiconductive device 22 is similarly connected with the upper set of rods shown in FIGURE 1, one element thereof being directly connected physically and electrically with one of the rods and the other elements thereof being connected electrically via wires with the other spaced-apart rods.

While the preferred embodiments of the invention presented herein incorporate specific materials for each of the components referred to above, and while the construction presented in FIGURE 1 represents the preferred embodiment of the invention, it is to be understood that various modifications can be made to such construction aside from the modification to be explained hereinafter in connection with FIGURE 3, and that various materials can be used for forming the header described above, all without departing from the scope and spirit of the invention.

However, I have found that particularly advantgeous results can be obtained if the disc member 4 of FIGURE 1 is formed of corrosion-resistant steel, if the insulating members or collars 12 are formed of glass, and if the rods 14 are formed from dumet, a copper-clad iron-nickel alloy.

Preferably, as explained, the rods are formed from an iron-nickel alloy, but they may be formed of copper, gold, silver, or other low-resistance alloys. Similarly, the disc member 4 may be formed from cobar, copper, or other alloys which have good thermoconductivity and act as a heat sink. As opposed to using glass for the insulating materials, various ceramics can be used.

The semiconductor element which is electrically and physically connected with one of the rods, namely, the element 20B referred to in connection with FIGURE 1 above, is joined with the rod by spot welding preferably. However, the bonding can be obtained by alloying, by heating in a furnace, by silver soldering, nickel soldering, lead soldering, indium soldering, or soldering with other materials of such type. The connecting of the lead wires from the semiconductive devices with the rods can also be achieved by similar soldering techniques.

As shown in FIGURE 2, the header of FIGURE 1 can be provided with a cap member such as that designated by the numeral 30. This cap member may be formed of the same material as the disc 4 if desired. Preferably, the cap member is provided with a flanged lower skirt edge 32 which cooperates with a peripheral ring projection 34 provided on the upper face 8 of the disc member 4 at the periphery thereof. The ring projection 32 serves to seat the cap on the header prior to welding of the same thereto. However, it should be understood that the cap can be fixed to the header by compression fit, by soldering, by press fit, or other suitable means.

Moreover, it is to be understood that although preferably a cap member such as that designated by the numeral 30 is provided, if desired, the header and semiconductor devices carrier thereby may be completely encased in accordance with the invention in an insulating plastic, glass, or ceramic, in which event the cap member 30 would not be used at all.

Although exemplary materials have been given for each of the components set forth above, the primary factor of importance is that the materials have the desired heat transfer properties, desired electrical resistance properties, and compatible thermal coefficients of expansion. By "compatible" thermal coefficients of expansion, as used herein, there is meant materials which expand and contract at such rate that there is no separation or cracking between components formed of different materials as a result of temperature change. It is important that the characteristics of the header as formed remain constant, and that there be no cracking of the glass insulation, for example.

Figure 3:
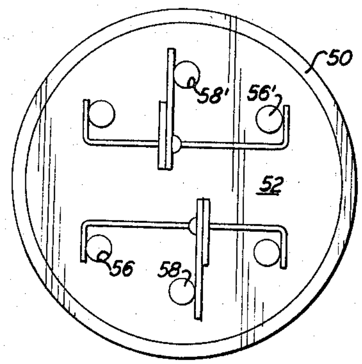
FIGURE 3 is a plan view similar to FIGURE 1, but presenting a modified form of the present invention.

A modified form of the invention, as suggested above, is presented in FIGURE 3. This modified form provides for using an outer or encasing ring 50 which surrounds the periphery of a disc member 52 formed of an insulating material. Preferably, the ring 50 is metal, and the disc 52 is formed from either glass or a ceramic. Such disc member is provided with a plurality of spaced-apart openings 56 extending between opposed faces thereof, and through these openings pass the rods 58. The rods 58 are preferably identical with the rods 14 discussed in connection with FIGURES 1 and 2, and the construction is basically the same. The ring 50 and disc member 52 serve to provide a header frame member just as the disc member 4 serves to provide such a member. Moreover, the rods are electrically insulated from one another and fixed in spaced-apart relation. The semiconductor devices 20′ and 22′ correspond exactly with the semiconductor devices 20 and 22 presented in FIGURE 1. The coupling of the elements of such semiconductor devices is essentially the same as described above.

Figure 4:
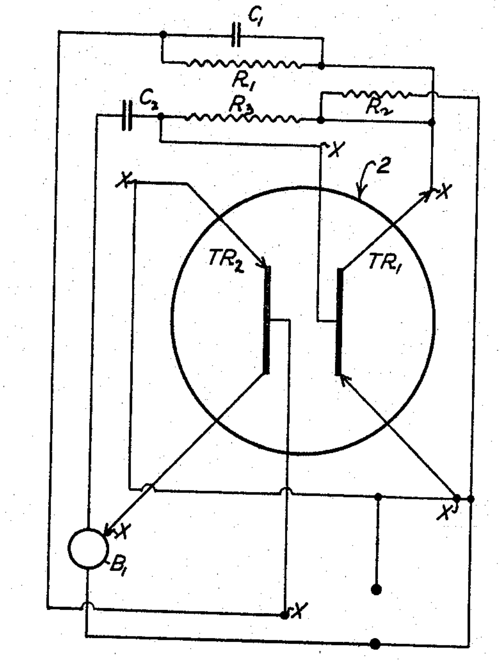
FIGURE 4 is a schematic diagram of a transistorized light-flasher circuit, and presents an example of the type of system with which the construction of the present invention is particularly useful.

An example of the manner in which a unit of the type shown in FIGURES 1 and 3 may be used with an existing circuit is presented in FIGURE 4. In this figure, the header is again generally designated by the numeral 2, and the semiconductive devices are designated as $TR_1$ and $TR_2$. These semiconductor devices correspond with such devices numbered 20 and 22 in FIGURE 1, or 20′ and 22′ in FIGURE 3. The rods which project from the unit 2 are coupled with external wires in any suitable manner as at the points marked X. The circuit presented in FIGURE 4 is a conventional light-flashing circuit wherein the components are as follows:

| | |
|---|---|
| $TR_1$ | 2N1030. |
| $TR_2$ | 2N61. |
| $R_1$ | 6.2K. |
| $R_2$ | 1K. |
| $R_3$ | 1.7K. |
| $C_1$ | 175 $\mu$f. (5 v.). |
| $C_2$ | 15 $\mu$f. (12 v.). |
| $B_1$ | GE 1050 bulb. |

It is believed that the operation of this circuit is self-apparent to those of ordinary skill in the art, and accordingly a detailed discussion will not be made herein. The invention does not lie in the particular circuit, but as emphasized hereinabove, lies in the provision of a semiconductor header and package which minimizes the space requirements.

It will be understood that while three element semiconductor devices, namely, transistors, have been referred to hereinabove as incorporated within the header, any form of semiconductor device may be incorporated therein in the same manner. The invention is not limited to use of transistors, but provides for the utilization with the header of transistors, diodes, rectifiers of any type, as well as any other type of semiconductive device.

As an example of the manner in which the header of the present invention serves to minimize space, a unit having 25 transistors therein has been constructed and this unit has a diameter of approximately 1 inch and a height of approximately ½ inch, with 75 leads protruding from the base of the unit. In contrast to this size unit, 25 transistors, each having 3 leads, would normally each occupy a space of approximately 5⁄16 inch in diameter. Thus, at a minimum, a unit incorporating 25 transistors would require a maximum dimension of 5⁄16 x 25, or approximately 8 inches.

Accordingly, it should be apparent that the unit of the present invention enables a reduction in space.

After reading the foregoing detailed description of the illustrative and preferred embodiments of the invention, it should be apparent that the objects set forth at the outset of this specification have been successfully achieved. Various modifications other than those specifically suggested may occur to those of ordinary skill in the art after reading such description.

Accordingly, what is claimed is:

1. A semiconductor package comprising:

(a) at least two semiconductors, each having at least two cooperating semiconductive elements;

(b) a relatively flat solid support disc having a plurality of separate spaced apart openings therein extending between opposite sides thereof and a narrow beveled surface around one side of said support disc;

(c) a plurality of electrically conductive rods extending through said support disc, one element of each of said semiconductors being directly physically and electrically connected on said one side of said support disc to a different one of said rods, and the other element of each of said semiconductors being electrically connected to still different ones of said rods;

(d) insulating collars fixed within each of said openings in said support disc with each of said rods passing through and being fixed in a different one of said insulating collars whereby said rods are electrically insulated from one another; and (e) a cylindrical cap member having a beveled surface around the inner edge of the open end thereof and secured to said support disc to enclose said semiconductors and said rods on said one side of said support disc;

(f) said support disc and said cap member having their respective beveled surfaces in seating and sealing engagement across the entire interface therebetween.

2. A semiconductor package as defined in claim 1 wherein the said support disc, said insulating collars, and said rods are formed of different materials having compatible co-efficients of thermal expansion.

3. A semiconductor package as defined in claim 2 wherein said support disc is formed of corrosion resistant steel, wherein said insulating collars are formed of glass, and wherein said rods are formed of dumet.

References Cited by the Examiner

UNITED STATES PATENTS

| | | | |
|---|---|---|---|
| 2,069,633 | 2/1937 | Tripp | 317—101 |
| 2,445,719 | 7/1948 | Sylvester | 317—101 |
| 2,796,563 | 6/1957 | Ebers | 317—235 |
| 2,827,598 | 3/1958 | Levy | 317—235 |
| 2,880,383 | 3/1959 | Taylor | 317—235 |
| 2,947,924 | 8/1960 | Pardue | 317—235 |
| 2,947,925 | 8/1960 | Maynard et al. | 317—235 |
| 3,020,454 | 2/1962 | Dixon | 317—235 |
| 3,021,460 | 2/1962 | Milam | 317—234 |
| 3,100,027 | 8/1963 | Stelmak | 317—235 |

JAMES D. KALLAM, *Acting Primary Examiner.*

JOHN W. HUCKERT, *Examiner.*